Figure 1:
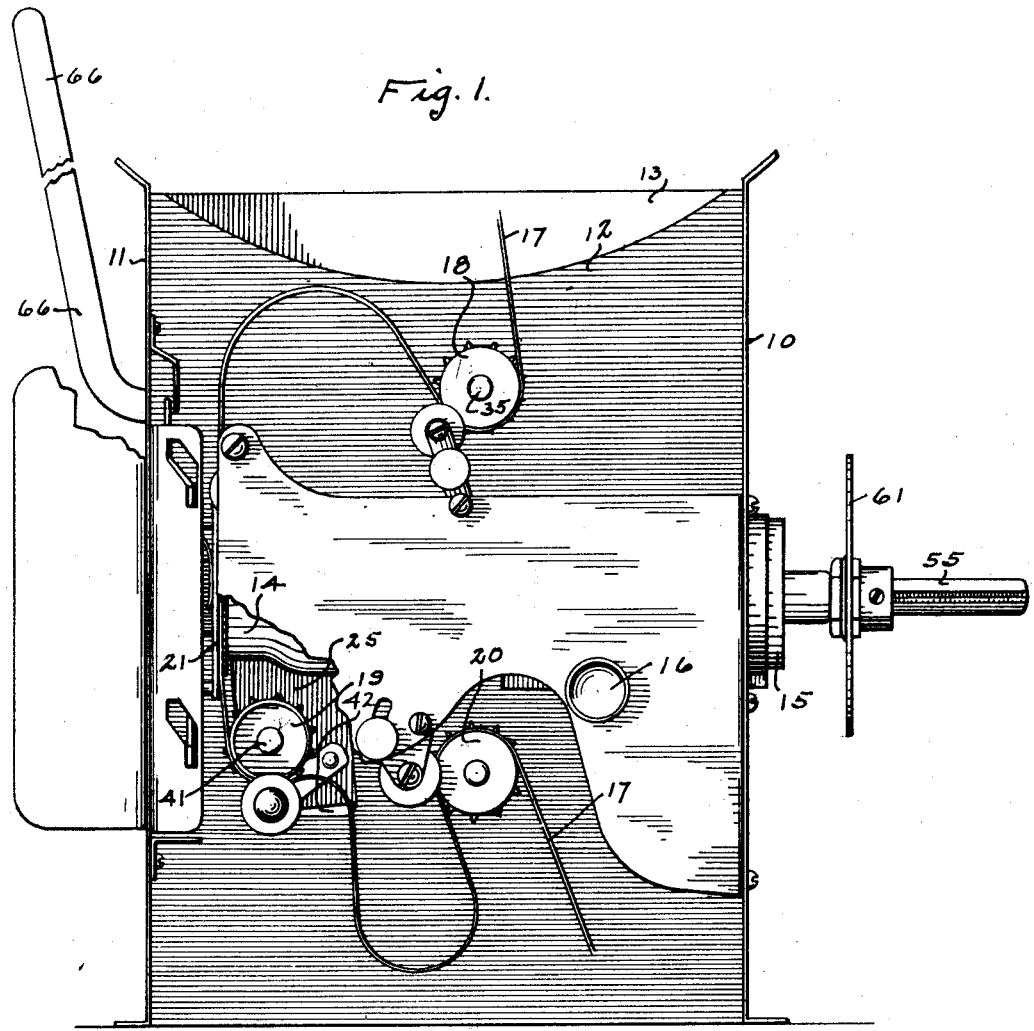

Oct. 13, 1931.  L. D. KOHLMEYER  1,827,011
POWER TRANSMISSION AND FRAMING MECHANISM FOR MOTION PICTURE MACHINES
Filed Aug. 29, 1929   3 Sheets-Sheet 1

INVENTOR,
Lawrence D. Kohlmeyer,
By
Attorneys.

Oct. 13, 1931.  L. D. KOHLMEYER  1,827,011
POWER TRANSMISSION AND FRAMING MECHANISM FOR MOTION PICTURE MACHINES
Filed Aug. 29, 1929  3 Sheets-Sheet 2

INVENTOR,
Lawrence D. Kohlmeyer,
BY Minturn & Minturn,
Attorneys.

Oct. 13, 1931. L. D. KOHLMEYER 1,827,011
POWER TRANSMISSION AND FRAMING MECHANISM FOR MOTION PICTURE MACHINES
Filed Aug. 29, 1929 3 Sheets-Sheet 3

INVENTOR,
Lawrence D. Kohlmeyer,
By Minturn & Minturn,
Attorneys.

Patented Oct. 13, 1931

1,827,011

UNITED STATES PATENT OFFICE

LAWRENCE D. KOHLMEYER, OF INDIANAPOLIS, INDIANA

POWER TRANSMISSION AND FRAMING MECHANISM FOR MOTION PICTURE MACHINES

Application filed August 29, 1929. Serial No. 389,272.

This invention relates to the art of motion picture projecting machines and particularly to the power transmission throughout the machine together with means associated therewith for "framing" the picture. This invention is an improvement over that as shown in my Patent No. 1,187,153, and requires far less power to operate, and is more rigid in construction.

It is the usual practice to form motion picture films with perforations evenly spaced apart longitudinally along the sides of the film into which teeth projecting from rollers may project as a means of forcibly carrying the film through the projecting machine. It is also the usual practice to carry such a film across a window perpedicular to a shaft of light passing therethrough and to bring each individual picture on the film to a complete stop before moving it on to bring the next succeeding picture to register behind, or to be "framed" with the window, a shutter being employed to cut off the shaft of light during the interval of moving the film from one picture to the next. Due to natural wear and tear of the film and to the intermittent motion across the window it usually happens that some of the perforations along the edges become enlarged and the intervening spaces therebetween torn out so that the film then is stopped in such a position that the individual pictures thereon are not properly centered in reference to the window with the result that the upper or lower part of the picture as the case may be is cut off and is not shown on the screen.

In such a case the film must be shifted to correct the position at which it stops.

One of the objects of this invention is to provide means for "framing" the picture without changing the position of the shutter. Heretofore, the shutter was also shifted when the picture was "framed", and the shutter was made sufficiently wide to cover the lens when so shifted, with the result that, on account of the increased width, difficulty was encountered in securing ample light on the screen from through the lens. Therefore, by maintaining the shutter in a fixed plane of rotation, the shutter width may be reduced to permit more light to travel therepast. Other objects reside in the provision of a power transmission drive completely enclosed which may be rocked without changing the position of the shutter and may be completely filled with lubricant, and in the provision of such a structure that may be completely assembled independently of the machine and then incorporated in the machine to save labor and permit of greater accuracy than were the structure to be assembled piece by piece within the walls of the machine.

Other objects reside in the maintenance of fixed spool centers in reference to a moving spool center, and in the unique method of obtaining the proper speeds with gearing compactly carried within a movable housing.

These and other objects will become apparent in the following description of the invention as illustrated by the accompanying drawings, in which—

Figure 4:
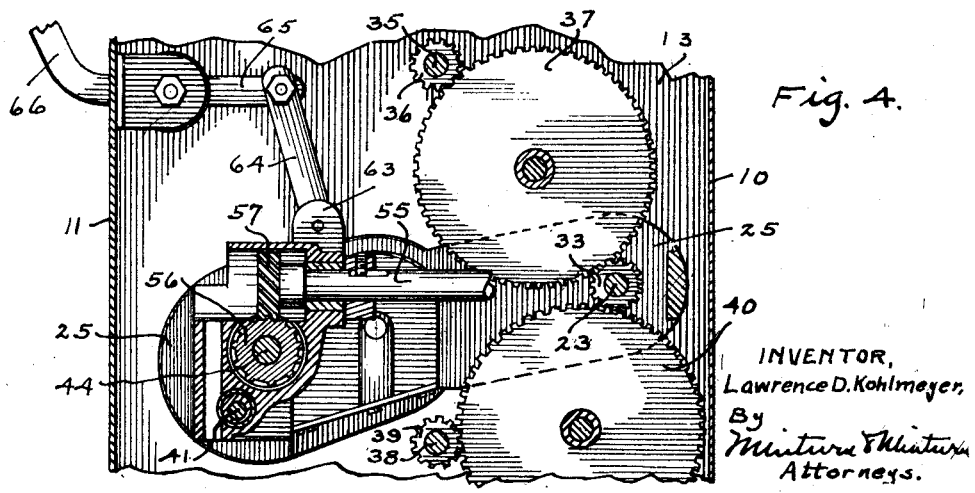
Figure 2:
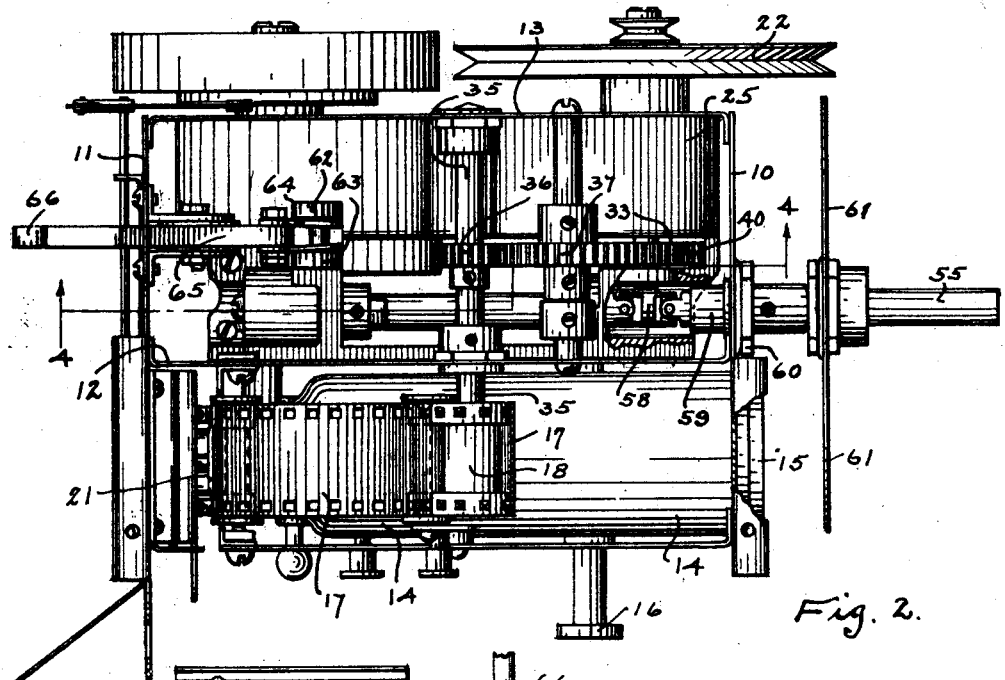
Figure 3:
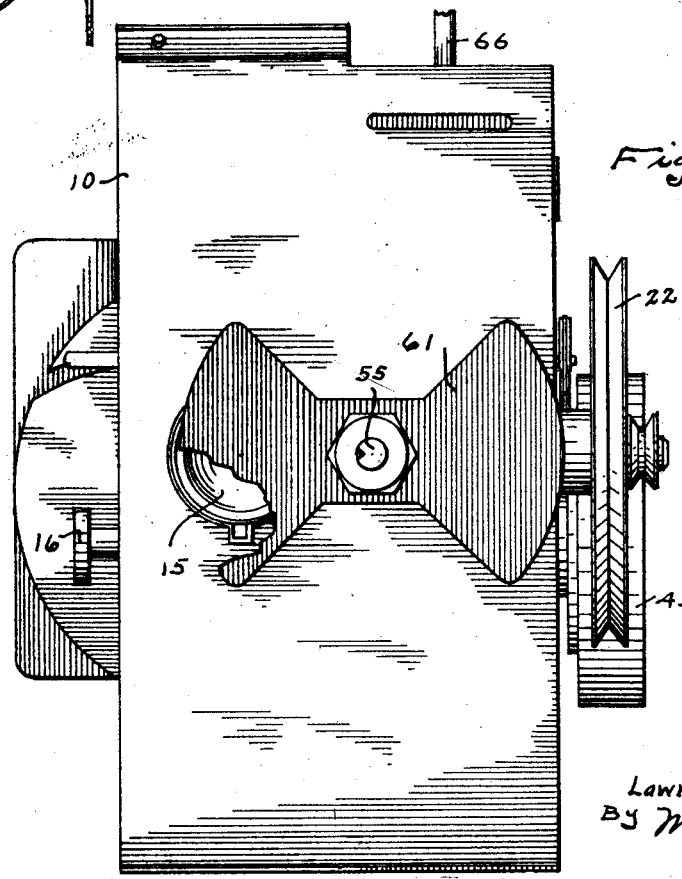
Figure 5:
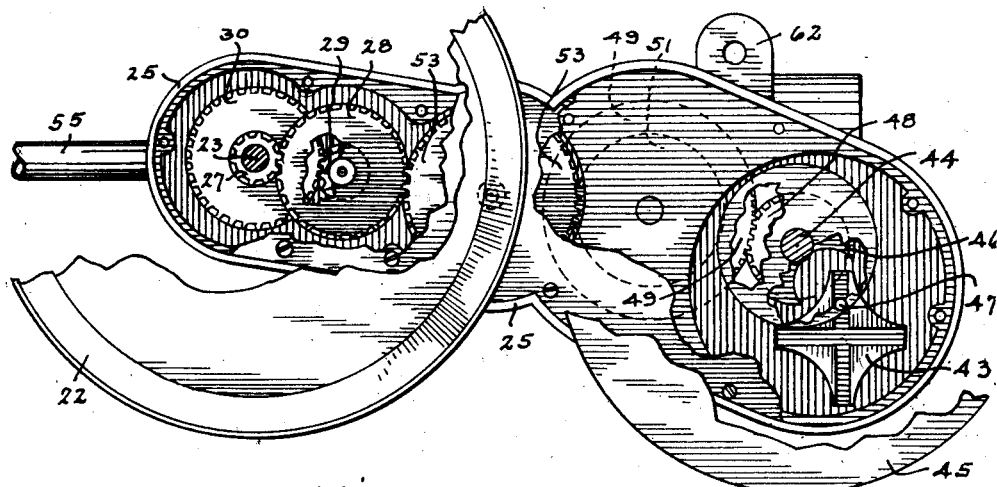

Fig. 1 is a right hand side elevation of a projecting machine with the lamp and reel cases removed;

Fig. 2, a top plan view of that part of the machine as shown in Fig. 1;

Fig. 3, a front elevation;

Fig. 4, a vertical longitudinal section on the line 4—4 in Fig. 2;

Fig. 5, a fragmentary elevation of the left hand side of the transmission; and

Figure 6:
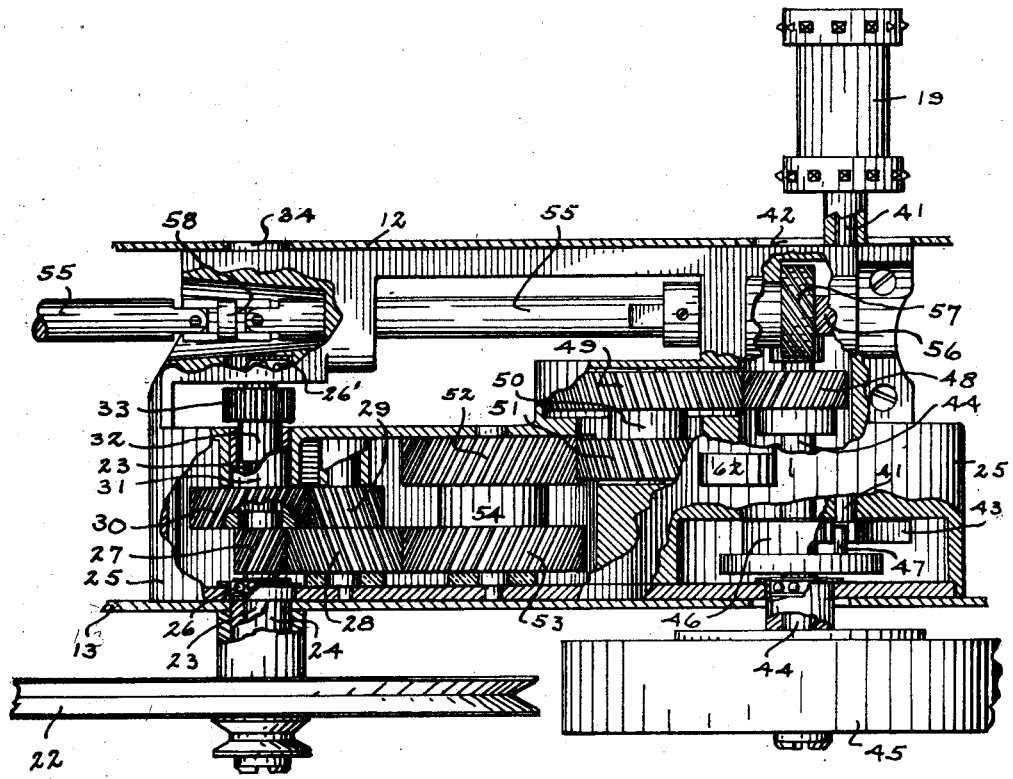

Fig. 6, a fragmentary top plan view of the transmission as shown in Fig. 5.

Like characters of reference indicate like parts throughout the several views in the drawings.

Between the front wall 10 and rear wall 11 are mounted the spaced apart side walls 12 and 13, the wall 12 being set back in from the right hand side to permit the mounting on the outside thereof of the tube 14 through which a beam of light may be directed horizontally from a lamp (not shown) at the rear thereof to issue through a lens 15 movably positioned in the front end to permit focusing in the usual manner by means of the thumb screw 16.

The film 17 is threaded downwardly around and upwardly about the spool 18 and looped around and passed downwardly across the rear end of the tube 14 and around and across under the spool 19 and is then looped downwardly loosely and finally passed upwardly and around and downwardly about the spool 20 from which it is carried to a lower reel (not shown).

Referring to Fig. 1, particularly, it is to be noted that between the spool 18 and the tube 14 there is a loose loop of the film 17, and that there is also a loose portion of the film between the spool 19 and the spool 20, so that the film may be raised or lowered over the end of the tube 14 as the position of the spool 19 may be changed vertically. A frame 21 normally presses the film 17 against the rear of the tube 14 to permit the film to slidingly pass therebetween as it may be pulled downwardly upon rotation of the spool 19.

It is to be noted, Figs. 1 and 2, that the film 17 is provided in the usual manner with spaced apart perforations along its outer edges into which the projections from the spools 18, 19 and 20 may extend in the usual and well known manner in order to carry the film through the machine. It may be observed that as long as the speeds of the spools 18, 19 and 20 remain constant and are turned at the same rate, the upper and lower loops of the film 17 above referred to will remain.

Referring now principally to Figs. 2, 4, 5 and 6, a belt pulley 22 is provided which may be driven from any suitable source of power (not shown) and which is fixed to the shaft 23. The shaft 23 extends through a boss 24 pivotally supported in the wall 13 and carried by the gear housing 25 through a ball bearing 26 and on across and beyond the housing 25 to have its other end rotatably supported in the bearing 26'.

Within the housing 25 a spiral gear 27 fixed on the shaft 23 to be revolved therewith meshes constantly with an idler gear 28 of a larger diameter. Fixed to the gear 28 is the gear 29 of smaller diameter which in turn meshes with the gear 30 rotatably supported on the shaft 23. The gear 30 has a collar 31 extending therefrom with a larger internal diameter than is that of the shaft 23 and the collar 32 is forcibly pressed within the collar 31 with a pressed fit to be revolved therewith rotatably about the shaft 23 to revolve the gear 33 which is an integral extension from the collar or sleeve 32. On the same transverse axis as that of the shaft 23 is a boss 34 rockably carried in the side wall 12 so that the entire housing 25 may be raised and lowered between the two walls 12 and 13 with that axis as its center of rotation, from which structure it is evident that the gear 33 will not be moved from off that axis regardless of the degree of rotation of the housing 25. The spool 18 is mounted on a shaft 35 which extends transversely across the two walls 12 and 13 and carries in a fixed position thereon the spur-gear 36 which is driven through the idler gear 37 from the gear 33.

In the same manner the spool 20 is fixed on the shaft 38 which extends transversely across the walls 12, 13 and carries in fixed relation thereon the spur-gear 39 which is driven by the idler gear 40 from the gear 33. The gears 36 and 39 have the same number of teeth as have also the gears 37 and 40 so that both gears 36 and 39 are revolved at the same speed upon rotation of the gear 33.

The spool 19 is fixed on a shaft 41 extending through a window 42 in the wall 12 and passes through the housing 25 to carry on its opposite end thereof a star wheel 43.

Parallel to the shaft 41 is a shaft 44 which projects from the left hand side of the frame 25 to carry thereon a flywheel 45. The wall 13 is cut away to be out of contact with this shaft. A cam 46 is fixed on the shaft 44 and has a pin 47 associated therewith to intermittently rotate the wheel 43 in the usual and well known manner upon rotation of the shaft 44 so that the spool 19 is correspondingly rotated intermittently with the resultant intermittent stopping of the film 17 as it is moved across the rear end of the tube 14. The point in which the film 17 is stopped is a critical one in that the picture may not be stopped at the right point across the end of the tube 14. By raising or lowering the frame 25 to correspondingly move the spool 19 therewith will permit the film 17 to be stopped intermittently in the correct position. Since there are loops of film both above and below the tube 14, this rocking of the frame 25 may be accomplished without damage to the film.

The shaft 44 carries a spiral gear 48 fixed thereon in mesh with the gear 49 which is integrally connected by the hub 50 with the gear 51, the gears 49 and 51 being rotatively supported in the frame 25. The gear 51 is in mesh with the gear 52 also integrally connected with the gear 53 by the hub 54, which gear 53 is in mesh with the gear 28. It is thus to be seen that the shaft 44 is gear driven from the shaft 23. The ratio of the gearing therebetween is such that the spool 19 may be intermittently revolved as above indicated in timed sequence with the continuous rotation of the spools 18 and 19 whereby the film 17 may be fed across the rear of the tube 14 without an appreciable gain or loss in lengths of the upper and lower loops.

From the right hand side of the part of the frame 25 which houses the respective gears above indicated, is an extension contacting the wall 12 which rotatively supports the shutter shaft 55. A spiral gear 56 is fixed on a shaft 44 beyond the gear 48 to mesh with the gear 57 which is fixed on the end of the shaft 55 so that the shaft 55 may be revolved upon rotation of the pulley 22.

The shaft 55 has its longitudinal axis intersecting the transverse axis of the shaft 23 and is broken at the point of intersection to have a universal joint 58 between the front and rear ends thereof. The front end of the shaft 55 is rotatively carried in a bearing sleeve 59 fixed by the nut 60 in the front wall 10 and extends on forwardly therefrom to carry the shutter 61 thereon. The shutter 61 is of the usual and well known construction and is properly mounted on the shaft 55 so that the lens 15 is covered at the patricular instant during which the film 17 is moving across the rear end of the tube 14.

The housing 25 is provided with two upturned ears 62 and 63 on its top side near the rear end between which are pivotally interconnected the links 64 which extend upwardly to be pivotally attached to the forward end of the arm 65 of the lever 66 which is pivotally supported from the wall 11. By pulling the lever 66 rearwardly away from the wall 11, the arm 65 is rocked upwardly to lift the rear end of the frame 25 to rock it about the horizontal axis of the shaft 23 and thereby lift the spool 19. By pushing the lever forwardly, the spool 19 is correspondingly lowered and the film 17 thereby moved downwardly to stop at a lower point back of the tube 14.

By reason of the universal joint 58 in the shaft 55, it is to be noted that the shutter 61 is not rocked, but is maintained in a constant vertical plane of rotation so that it may function properly in reference to the lens 15.

While I have here shown and described my invention in the best form as now known to me, it is obvious that many structural changes may be made from that form without departing from the spirit of the invention, and I therefore do not desire to be limited to that precise form, nor any more than may be required by the following claims.

I claim:

1. In a picture projecting machine, a main frame, a gear frame rockably supported by said main frame, an intermittently rotated film-feed spool supported by the gear frame, constantly rotated film-feed spools supported by the main frame at appreciable distances from the center of oscillation of said gear frame, a shutter supported by said main frame to rotate in a fixed plane, and a shutter drive from said gear frame, a driving shaft in said gear frame on its axis of oscillation, a train of gears carried by said gear frame, driven by said driving shaft, and means between said gears and said intermittently rotated spool for causing intermittent rotation thereof upon rotation of said driving shaft, said shutter drive being operated by said gears, and gears between said driving shaft and said constantly rotated spools.

2. In a picture projecting machine, a main frame, a gear frame rockably supported by said main frame, an intermittently rotated film-feed spool supported by the gear frame, constantly rotated film-feed spools supported by the main frame at appreciable distances from the center of oscillation of said gear frame, a shutter supported by said main frame to rotate in a fixed plane, and a shutter drive from said gear frame, a driving shaft in said gear frame on its axis of oscillation, a train of gears carried by said gear frame, driven by said driving shaft, and means between said gears and said intermittently rotated spool for causing intermittent rotation thereof upon rotation of said driving shaft, said shutter drive being operated by said gears, and gears between said driving shaft and said constantly rotated spools, and means for oscillating said gear frame to vary the position of said intermittently rotated spool, said driving shaft remaining on the fixed axis of oscillation of the gear frame.

3. In a picture projecting machine, a unitary power transmission comprising a housing, a driving shaft at one end forming an axis about which said housing may be rotated, a train of gears from said shaft to the other end of the housing, a spool carried on a shaft entering said housing near said other end, an intermittent drive mechanism between said gears and said spool shaft including a cam shaft, a shutter shaft gear-driven from said cam shaft and extending toward said first end of the housing, a shutter mounted to be revolved in a fixed plane regardless of the position of rotation of said housing, and a flexible connection between said shutter shaft and said shutter.

4. In a picture projecting machine, a unitary power transmission comprising a housing, a driving shaft at one end forming an axis about which said housing may be rotated, a train of gears from said shaft to the other end of the housing, a spool carried on a shaft entering said housing near said other end, an intermittent drive mechanism between said gears and said spool shaft including a cam shaft, a shutter shaft gear-driven from said cam shaft and extending toward said first end of the housing, a shutter mounted to be revolved in a fixed plane regardless of the position of rotation of said housing, a flexible connection between said shutter shaft and said shutter, and speed change gearing on said driving shaft driving a gear without the housing.

5. In a picture projecting machine, a unitary power transmission comprising a housing, a driving shaft at one end forming an axis about which said housing may be rotated, a train of gears from said shaft to the other end of the housing, a spool carried on a shaft entering said housing near said other end, an intermittent drive mechanism between said gears and said spool shaft including a cam shaft, a shutter shaft gear driven from said cam shaft and extending toward said first end of the housing, a shutter mounted to be revolved in a fixed plane regardless of the position of rotation of said housing, and a flexible connection between said shutter shaft and said shutter, and a flywheel on said cam shaft.

6. In a picture projecting machine, a unitary transmission comprising a housing, a driving shaft at one end of the housing forming an axis about which said housing may be rotated, a train of gears between said shaft and the other end of the housing, a film driving spool carried on a shaft entering said housing near said other end, a shutter shaft rotatably mounted alongside of said housing, gear means at said other end of the housing between said train of gears and said shaft for revolving said shutter shaft from said driving shaft, a shutter stub shaft fixed longitudinally and mounted to be revolved about a fixed longitudinal axis, and a universal joint connecting said shutter shaft and said shutter stub shaft, the pivotal center of said joint being on the extended axis of said driving shaft.

In testimony whereof I affix my signature.

LAWRENCE D. KOHLMEYER.